Nov. 13, 1962  G. M. BOUTON  3,063,145
SOLDERING OF ALUMINUM
Filed April 15, 1957

INVENTOR
G. M. BOUTON
BY
ATTORNEY

United States Patent Office 3,063,145
Patented Nov. 13, 1962

3,063,145
SOLDERING OF ALUMINUM
George M. Bouton, Madison, N.J., assignor to Bell Telephone Laboratories, Incorporated, New York, N.Y., a corporation of New York
Filed Aug. 15, 1957, Ser. No. 678,271
5 Claims. (Cl. 29—499)

This invention relates to methods for soldering aluminum to aluminum, aluminum to other metals, to joints so produced and to solder material suitable for use in such methods.

The soldering of aluminum differs from the soldering of many common metals, such as copper, in that aluminum forms a more tenacious refractory oxide. As in the soldering of other conventional metals, since a good solder joint may not be made to an oxide coating it is first necessary to remove such coating. In the instance of copper, such coating is easily removed by use of any of numerous commercially available fluxes many of which are non-corosive or only moderately corrosive so that their removal does not pose a serious problem.

Removal of aluminum oxide in the preparation of aluminum for soldering, however, necessitates a much more active flux especially where use is to be made of the higher melting solders conventionally used with aluminum. Such a flux may contain a heavy metal chloride or fluoride.

Although such fluxes are moderately effective in removing aluminum oxide, subsequent reaction with the metallic aluminum is accompanied by the formation of copious quantities of aluminum chloride or aluminum fluoride which are extremely harmful and which must be exhausted.

The difficulty of forming a solder joint to aluminum has excited considerable comment in the art and many solder techniques and compositions have been developed. In general, solder compositions used in such techniques may be divided into three groups; the so-called low temperature solders melting below about 500° F. represented by the tin-zinc eutectic, the intermediate melting solders melting between 500 and 720° F. represented by the 70 tin-30 zinc composition, and the high melting solders melting above 720° F. generally containing 90 percent or more of pure zinc and small amounts of certain alloying elements designed to depress the melting point and improve flow characteristics. In general, aluminum solder joints, to have reasonably corrosion resistant, must be made with one of the high temperature solders. Unfortunately solders of this group necessitate the use of the corrosive metallic salt fluxes discussed above.

Recognizing the difficulty in use of the corrosive fluxes and the deleterious effects of the residues which has prevented the use of such high melting solders especially in the soldering of thin stock, some publicity has been given a fluxless method known as ultrasonic soldering. In accordance with this method cavitation produced in a solder pool between the tip of an ultrasonic iron and the aluminum surface being soldered breaks up the oxide and permits the solder to wet the aluminum. Although it was hoped that this method would overcome the difficulties of conventional flux soldering, the confinement of the wetting action to the area under the tip of the iron, frequent bridging of unwetted areas giving the appearance of a completely tinned surface, and the general unreliability of joints so produced, together with the high initial cost of the necessary apparatus have prevented widespread use of this method.

By practice of the present invention strong aluminum to aluminum or aluminum to other metal, joints having tensile strength comparable to or exceeding that of the material being joined may be simply and reliably produced without use of special apparatus. The methods herein all use joining materials which are either well known high melting solders or are compositions which have heretofore not found use in the formation of solder joints but which are nevertheless properly classified as high melting solders. The excellent corrosion resistance of the solder materials used in the methods herein are well known to those skilled in the soldering and related metal working arts. The methods of this invention do not require the use of any flux material and in fact are generally impeded by the use of such an agent. Therefore, the removal of fumes formed during soldering and removal of corrosive residue is obviated. These methods are suitable for use in the soldering of both large stock and of small details. In general, joints produced by these methods are satisfactory whenever the mechanical strength and corrosion resistance of aluminum or an aluminum alloy is suitable.

In accordance with the methods of this invention a piece of aluminum stock to be joined is tinned with a high melting zinc solder by raising the temperature of the area of the aluminum to be joined to the melting point of the solder, drawing or gently rubbing the solid solder across the surface so heated whereupon the molten solder material wets the aluminum surface, floating the oxide layer to the top of the molten body, and thereafter stirring or puddling the molten body of solder so as to disperse the oxide layer together with any additional oxide floating upon its surface. The body of aluminum may then be permitted to cool. A piece of stock so tinned may be soldered to another body of aluminum which has been so treated or to a body of any other metal by the use, in the instance of aluminum to aluminum, of the same solder material or, in the latter instance, by the use of any conventional solder which will wet the second metal. Since the solder materials used herein are rendered molten only at temperatures in excess of about 720° F., these processes do not easily lend themselves to the use of a soldering iron but are readily carried out by use of a gas flame such as from a propane, acetylene, or oxyhydrogen torch.

The accompanying drawings depict the process steps used in producing a tinned surface at a soldered joint in accordance with the methods herein:

Figure 1:
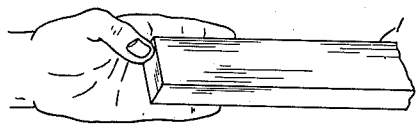
FIG. 1 is a perspective view of a body of aluminum to be tinned.

With further reference to the figures, the body of material 1 depicted in FIG. 1 is a body of pure aluminum or of an alloy predominating in such material such, for example, as any of the alloys bearing aluminum association alloy designation numbers. (See "Alloy Designation System for Wrought Aluminum," July 1954, The Aluminum Association, 420 Lexington Avenue, New York, N.Y.) Examples are 1100, 2024, 5052, 6063, 7072 and 2017.

The processes herein are useful in the formation of joints to aluminum and aluminum alloys containing 85% or more of aluminum by weight. This appears to include all commercial alloys generally designated "aluminum alloys." The use of the term "aluminum" herein is intended to include such alloys.

Figure 2:
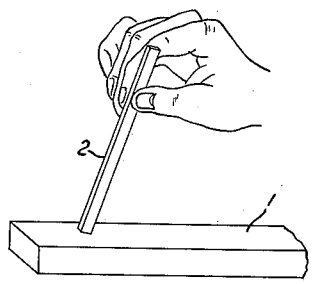
FIG. 2 is a perspective view of a bar of solder material contacting such a body.

FIG. 2 depicts a bar 2 of high melting zinc-containing solder such, for example, as the casting alloy known as "Zamak 3," contacting aluminum body 1.

Figure 3:
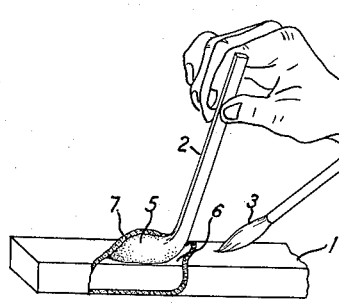
FIG. 3 is a perspective view partly in section of an intermediate phase of a process herein in which a molten body of such material has wet the aluminum surface and floated away a layer of aluminum oxide.

In FIG. 3 gas flame 3 which may, for example, be oxyhydrogen, emanating from torch 4 has heated the upper surface of body 1 to the melting point of solder body 2 so as to result in the formation of molten region 5 of the solder composition. As is shown in this figure the thermal conditions and slight pressure applied are such as to result in solid surface 6 of solder bar 2 contacting the upper surface of the aluminum body 1. Under such conditions molten region 5 wets the aluminum material of bar 1 thereby floating aluminum oxide layer 7 away from the upper surface of body 1.

Figure 4:
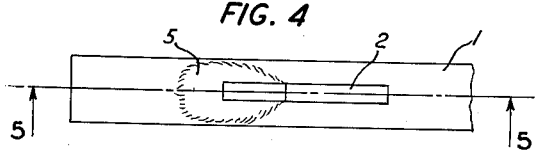
FIG. 4 is a plan view of the intermediate phase of FIG. 3.

In accordance with the plan view of FIG. 4 which is a view of the same phase of the operation shown in FIG. 3, it is seen that molten solder region 5 has expanded laterally beyond the confines of the upper surface of body 1 actually contacted at any time by solder bar 2 so that the area wetted exceeds that of the area which was contacted with the solid material of bar 2. Some of the aluminum oxide has been pulled along the surface of solder region 5 by bar 2. For simplicity the heating means is not shown in this view.

Figure 5:
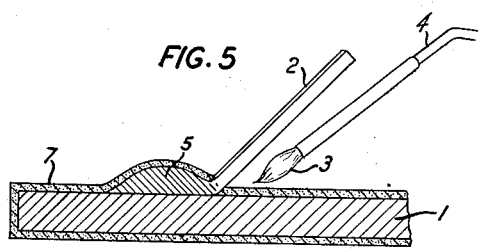
FIG. 5 is a cross-sectional view of such a body of aluminum showing the contacting bar of solder, a molten region of such solder wetting the aluminum surface and a layer of aluminum oxide floating on the molten region.

FIG. 5 is a sectional view of that phase of the operation shown in FIG. 4. In accordance with this view oxide layer 7, exaggerated in thickness, is shown to have been undermined by molten region 5 which wets aluminum body 1. Also shown are solder bar 2, gas flame 3 and heating means 4.

Figure 6:
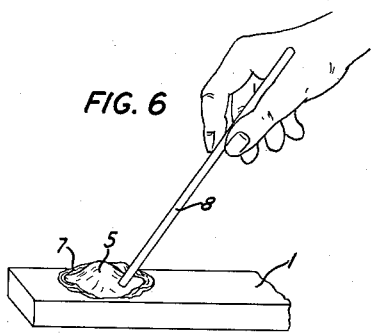
FIG. 6 is a perspective view showing the puddling operation by which the layer of aluminum oxide together with any solder oxide is dispersed so exposing the solder region.

FIG. 6 depicts a puddling operation by which oxide coating 7 is being broken and dispersed over the surface of molten solder 5 which wets aluminum body 1. Any solder oxide formed is also dispersed by this operation. The puddling operation is being carried out with member 8 which may be the bar of solder, a piece of wood or any other material which will not introduce undesirable impurities into the solder. Material desirable from this standpoint will be evident from the discussion of desirable impurity limits of the solder material set forth in this description. Depending on the size and heat content of solder body 5 it may be desirable to maintain the surface of aluminum body 1 in a heated condition by use of a heating means such as torch 4 shown in the preceding view. Puddling is a very rapid operation and may be accomplished merely by lightly drawing a puddling member, such as member 8, across the upper surface of the molten solder. All that is required here is that the oxide layer 7 be broken up. It is not required that this layer be completely removed.

After the puddling operation of FIG. 6, aluminum body 1 is tinned and a solder joint may be made thereto by use of any solder known to wet the second metallic body to be affixed. Where the second body is aluminum or an aluminum-containing alloy, or where it is an alloy predominating in zinc or a body coated with zinc, such as a galvanized body, the jointing solder is preferably one of the compositions of this invention.

Figure 7:
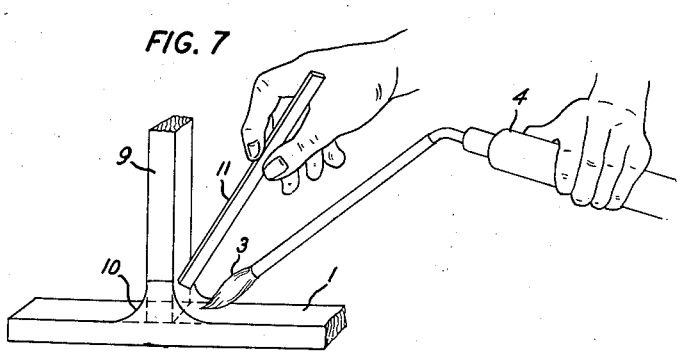
FIG. 7 is a perspective view illustrating the formation of a T joint made to a surface of aluminum so tinned.

In FIG. 7 there is depicted the final step in the process of making a T joint between a tinned aluminum body, such as body 1 shown positioned horizontally, and a second member such as member 9 which may also be an aluminum body. In the stage depicted, fillets 10 of a high melting solder composition set forth herein has been produced between bodies 1 and 9 by use of a solder bar 11 which is shown being drawn across the contiguous surfaces of bodies 1 and 9 which surfaces are maintained at the melting point of the solder material of bar 11 by use of gas torch 4 producing flame 3.

In forming a T joint, such as that shown in FIG. 7, it is generally preferable to first tin body 9. If body 9 is an aluminum-containing material the tinning operations are identical to those shown in FIGS. 1 through 6. If some other material is used, tinning is carried out in the manner prescribed by the conventions of the art. Although it is generally preferable to so tin vertical member 9 prior to the jointing shown in FIG. 7, this step may be dispensed with if care is taken in initially drawing solder bar 11 across the lowest vertical surface of member 9 to be jointed thereby enabling the oxide layer to float to the top of the fillet. If care is not so taken, so that the initial wetting of the vertical surface of body 9 to be joined occurs at a substantial distance from the contiguous horizontal surface of member 1, it is possible that some oxide will be entrapped under the lower part of the fillet thereby weakening the joint.

By way of further example, experimental data relating to tensile strength of T joints prepared on a variety of aluminum alloys and using three solder compositions of this invention are presented below. The procedure followed in all of the examples was identical. Both members were tinned in the manner described in the description of FIGS. 1 through 7. In each of the examples the horizontal member corresponding with body 1 of the figures and herein referred to as the "body" of the joint was a sheet of stock of dimensions 1" x 2" x 0.060" thick. The 2" dimension was parallel with the joint. The vertical member corresponding with body 9 of FIG. 7 was of dimensions 4" x 1" x 0.032" thick with the shorter dimension parallel with the joint. The vertical member is referred to herein as the "stem." The area tinned on the body was about 3/8" x 1¼". The stem member was tinned on both vertical surfaces parallel with the joint to a height of from 1/16" to 1/8" above the end butting the body. A heavier gage of stock was used for the body member so as to prevent shearing below the joint which would have rendered the test data of little significance. The data presented in each of the examples is an average of such data measured on six samples prepared in the same manner.

In reporting the examples, reference is had to three well-known aluminum designations of the aluminum association. For convenience the intentional ingredients of these alloys are tabulated:

| Alloy: | Ingredients |
| --- | --- |
| 1100 | 90.0% Al |
| 2024 | 4.5 Cu<br>1.5 Mg<br>0.6 Mn<br>Bal. Al |
| 5052 | 2.5 Mg<br>0.25 Cr<br>Bal. Al |

The breaking tensile stress of the three alloys in the order presented in the table are 17,700, 64,500 and 35,900 pounds per square inch. Accordingly, the tensile breaking stress of a 1" x 0.032" cross section of the same alloys corresponding with the butting area of the stem of the joints are 546, 2066 and 1150 pounds. As is to be expected it is noted from the examples that the heat treatment resulting from the soldering procedure results in some weakening of the stock.

*Example 1*

A T joint was made as above using a casting material designated "Zamak 3" as the solder material and 1100 aluminum. The composition of "Zamak 3" is discussed below. The resulting fillets were smooth and regular and of dimensions of approximately 1/8" vertically and 3/16" horizontally. When subjected to tensile strain the stem member broke within a region bounded by the top of the fillet and a further height of about ½″ under an applied stress of 370 poinds.

*Example 2*

A T joint was made using "Zamak 3" and 2024 aluminum. The fillet dimensions were the same as in Example 1. Three such joints broke through the fillets and three broke in the stem stock immediately above the fillets. Severance occurred at an applied stress of 1250 pounds.

*Example 3*

Two pieces of 5052 aluminum were soldered using "Zamak 3." The specimen broke within a distance of ⅛″ above the fillets. The breaking stress was 870 pounds. Fillet dimensions were the same as in the preceding examples.

*Example 4*

Two pieces of 1100 aluminum were soldered together using zinc-4 percent aluminum solder. The specimen broke immediately above the joint under an applied stress of 390 pounds. Fillet dimensions were the same as above.

*Example 5*

A zinc-4 percent aluminum joint was made between two pieces of 2024 aluminum. The specimen broke immediately above the joint under an applied stress of 1220 pounds. Fillet dimensions and appearance were as above.

*Example 6*

Two pieces of 2024 aluminum were first tinned with "Zamak 3" after which the tinned surfaces were joined using 60 tin-40 lead solder. The tin-lead solder readily wet the "Zamak 3" coated surfaces to produce a T joint having fillet appearance and dimensions of the examples above. All six specimens prepared in this manner severed at the joint under an average applied stress of 410 pounds.

*Example 7*

A joint was made between two pieces of 2024 aluminum using zinc-0.1 percent magnesium. Fillet appearance and dimensions were as above. Severance occurred through the joint under an applied stress of 1,000 pounds.

Many solder compositions are suitable in the practice of this invention. All such solder compositions contain at least 90 percent zinc and may in addition contain small amounts of other added ingredients included to improve handling properties of the solder, mechanical strength, and corrosion resistance of the resultant joint. As is well known in the metal working arts the properties of zinc and alloys predominating in zinc may be seriously effected by the inclusion of relatively small amounts of certain impurities. For example, materials such as lead, tin and cadmium have the effect of promoting intergranular corrosion. Permissible impurity limits from such a standpoint are well known to those skilled in the casting art and such limits are not set forth herein.

For the purpose of this invention it is preferred that the zinc included in any of the solder compositions be of a 99.99 percent purity. Such a material marketed by the New Jersey Zinc Company is known as "Special High Grade Zinc." It is to be understood that considerations as to such impurity limits are of primary concern only with regard to the aging of the joint. Where, by the nature of the particular objective, aging is not of paramount concern, the impurity limits may be exceeded without substantially effecting the workability of the solder or the immediate appearance or strength of the resultant joint.

Illustrative solders suitable for use in these processes include 99.99 percent zinc with no added ingredients, zinc-aluminum solders containing up to 10 percent aluminum but preferably no more than about 6 percent aluminum, typified by the zinc-4 percent aluminum of Examples 4 and 5. The addition of small amounts of magnesium to zinc-containing materials has a known stabilizing effect in slowing down beta transformation, corrosion and growth. In general, the amount of such magnesium addition should not be greater than about 0.2 percent since greater amounts effect the working property of the solder. An example of such a solder is the zinc-0.1 percent magnesium of Example 7.

Two well-known casting metals predominating in zinc and having excellent aging properties are preferred solder materials for the practice of this invention. These materials are designated "Zamak 3" and "Zamak 5". The composition limits of "Zamak 3" specified by ASTM in Specification B86 are as follows:

ADDED INGREDIENTS

| | Percent |
|---|---|
| Aluminum | 3.5 to 4.3 |
| Magnesium | 0.03 to 0.08 |

IMPURITIES

| | Percent max. |
|---|---|
| Copper | 0.1 |
| Lead | 0.007 |
| Cadmium | 0.005 |
| Tin | 0.005 |
| Iron | 0.100 |

The remainder of this composition is zinc.

"Zamak 5" differs from "Zamak 3" in that it contains 1 percent copper which is about the solid solubility of copper in 4 aluminum-96 zinc. The nominal composition contains 0.03 percent magnesium rather than 0.04 percent. The impurity limitations are the same.

From Examples 1, 2 and 3 it is seen that "Zamak 3" joints are of a tensile strength generally greater than that of the material jointed, the joint severing about 50 percent of the time only where the 64,500 p.s.i. 2024 aluminum alloy was used.

The invention has been described in terms of the preparation of a T joint. This joint was chosen since it is generally considered to be the most difficultly made of the common joints. The specific steps discussed in connection with the figures all relate to the making of such a joint and may not be directly applicable to other types of joints. The invention is not limited to the specific sequence of steps shown either in the preparation of a T joint or in the preparation of any other joint. In a broad sense the processes of this invention may be considered to be tinning processes rather than soldering techniques, since once the tinning procedure has been accomplished, subsequent jointing may be in accordance with any conventional means and using any solder suitable for the material to be joined to the tinned surface. Specifically, although it is a requirement of the processes herein that the oxide layer floated to the top of the molten body of solder be dispersed subsequent to jointing, a separate puddling member, such as that depicted in FIG. 6, may not be necessary. For example, where a T joint is to be formed, such puddling may be accomplished by moving the stem of the T across the surface of the molten solder so as to produce the same effect.

Although the technique has been specifically described in terms of contacting a surface to be tinned with a bar of solder and heating the surface to be tinned, this sequence is of no concern providing the surface to be tinned is at or above the melting point of the solder when the solid solder is drawn or otherwise moved across the surface.

What is claimed is:
1. Method of joining body surfaces each made of a metal selected from the group consisting of aluminum and aluminum alloys containing at least 85 percent aluminum by use of a fusible material selected from the group consisting of zinc and zinc-aluminum alloys containing at least 90 percent zinc, comprising heating the surfaces to be joined to a temperature at least as high as the melting point of the said fusible material, contact- ing the surfaces so heated with the solid fusible material, moving the said contacting solid fusible material across the surfaces to be joined so as to wet each of the said surfaces with molten regions of the said fusible material and to float an oxide layer to a surface of the said molten regions, and producing a common molten region by causing the molten regions to intermingle while puddling the said intermingled molten regions so as to disperse the said oxide layer.

2. Method in accordance with claim 1 in which the said body surfaces are placed in juxtaposition before joining and in which a molten region common to the said surfaces is initially formed.

3. Method in accordance with claim 1 in which the said body surfaces are initially wetted and subsequently placed in juxtaposition and joined.

4. Method in accordance with claim 1 in which the said fusible material contains up to 6 percent by weight of aluminum.

5. Method in accordance with claim 1 in which the said fusible material consists essentially of from 3.5 to 4.3 percent by weight of aluminum, 0.03 to 0.08 percent by weight of magnesium, balance zinc.

References Cited in the file of this patent

UNITED STATES PATENTS

| | | |
|---|---|---|
| 549,610 | Ramage | Nov. 12, 1895 |
| 733,662 | Lange | July 14, 1903 |
| 1,340,264 | Dean | May 18, 1920 |
| 2,087,716 | Banscher | July 20, 1937 |
| 2,722,168 | Godge et al. | Jan. 31, 1956 |

FOREIGN PATENTS

| | | |
|---|---|---|
| 964,788 | France | Aug. 24, 1950 |
| 887,873 | Germany | Aug. 27, 1953 |
| 604,194 | Great Britain | June 30, 1948 |
| 637,945 | Great Britain | May 31, 1950 |

OTHER REFERENCES

Hopkins: The Scientific American Cyclopedia of Formulas, Scientific American Publishing Co., 1923, pp. 843–833. (Copy in Div. 25.)